May 29, 1951 — C. WORCH — 2,555,071
RECORDING AND PLAYING PIANO MUSIC
Filed April 8, 1946 — 2 Sheets-Sheet 1
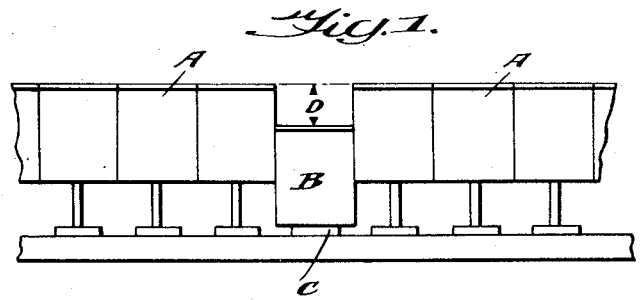
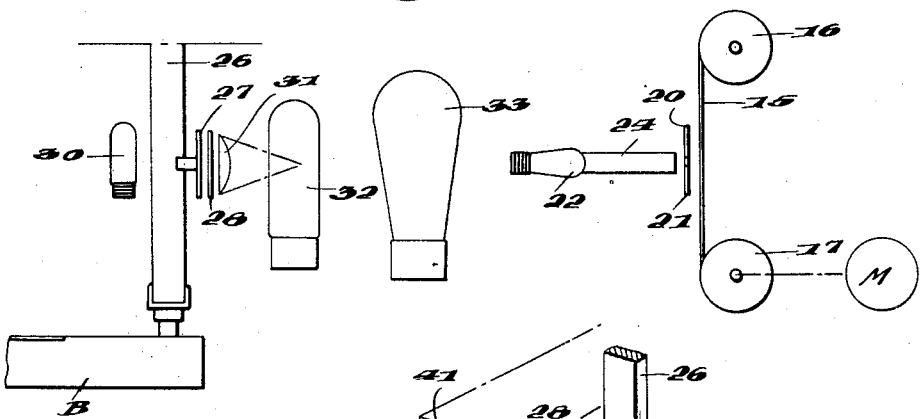
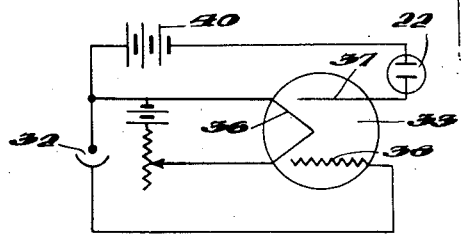
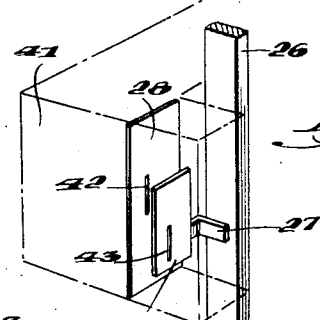
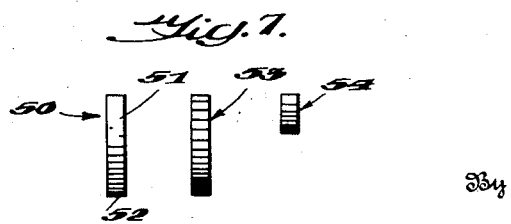
Inventor
CARL WORCH,
By Leech & Radue
Attorney May 29, 1951        C. WORCH        2,555,071
RECORDING AND PLAYING PIANO MUSIC
Filed April 8, 1946        2 Sheets-Sheet 2
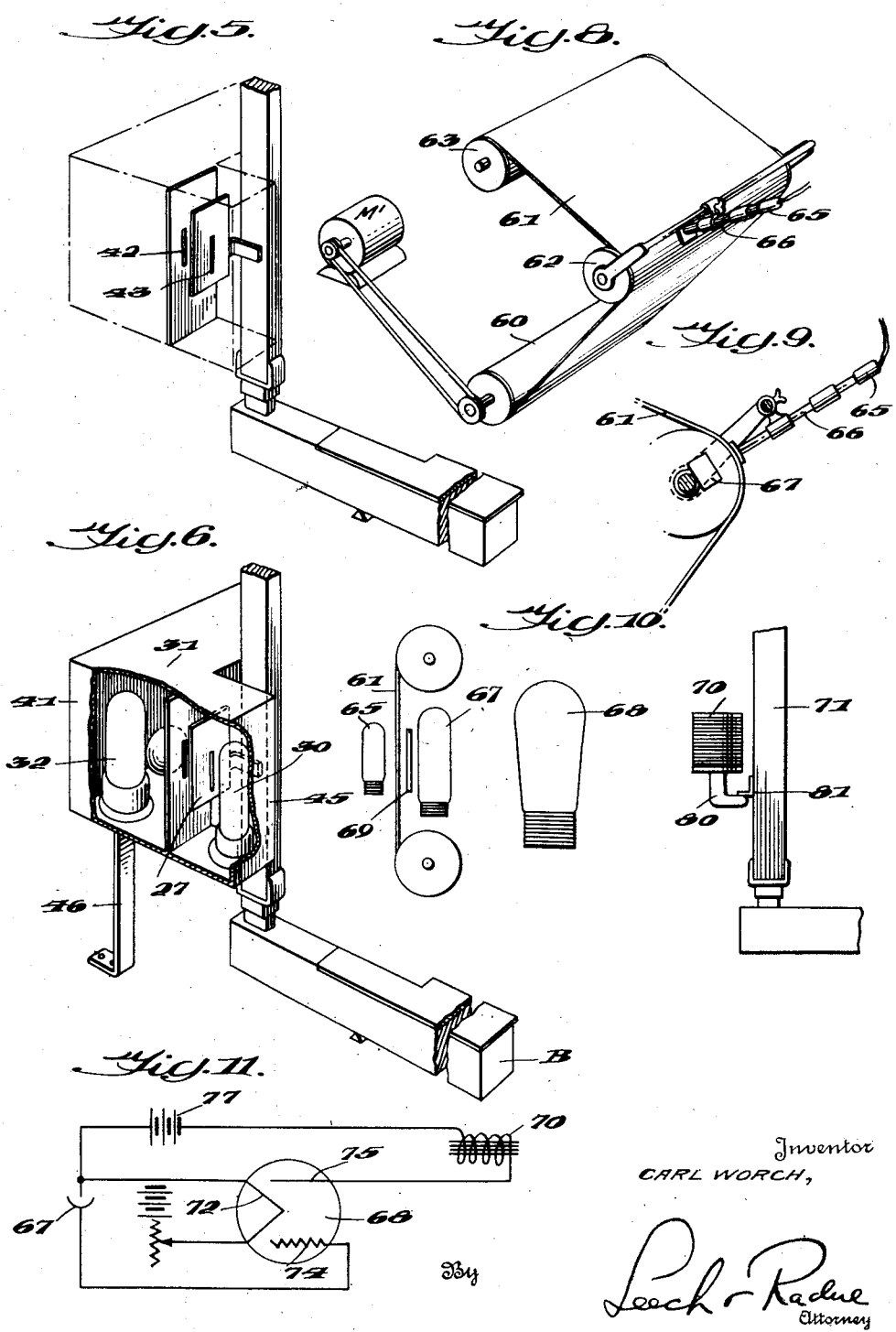
Inventor
CARL WORCH,
By Leech & Radue
Attorney Patented May 29, 1951

2,555,071

UNITED STATES PATENT OFFICE 2,555,071

RECORDING AND PLAYING PIANO MUSIC

Carl Worch, Berwyn, Md.

Application April 8, 1946, Serial No. 660,584

12 Claims. (Cl. 84—462)

This invention relates to methods of and apparatus for recording and reproducing or playing piano music.

It is a general object of the present invention to provide methods of and apparatus for recording and playing piano music whereby compositions may be recorded and preserved exactly as played by the performer and may be reproduced at any time directly on a piano with the playing of each note exactly reconstructing the playing at the time of the original production.

More particularly the invention deals with photoelectric methods and apparatus for recording piano compositions and reproducing the same on a piano.

An important object of the invention comprises the recording of piano music directly from the keyboard onto a photographic film with each note designated on a strip or section of a film in which the density or opacity varies in exact accordance with the time-intensity of the stroke of the performer's finger in producing the original note.

Another important object of the invention comprises an arrangement of method and apparatus for reproducing from a film as prepared in accordance with the previous object so as to exactly reproduce from the conventional piano the notes as recorded with their varying rates of time and intensity so that each individual note is played exactly, during the reproduction, as it was in the original performance.

One of the important features of the invention comprises the use of a photoelectric cell and a light value for each key of a piano used for recording, whereby relative movements of the valve parts control the density of film areas representative of the note characteristics as regards speed and intensity of stroke.

On the reproducing end an important feature of the invention resides in methods of and apparatus for reproducing or reconstructing each note as played by the piano from the areas of variable film density as recorded.

Other important features and objects of the invention will be more apparent to those skilled in the art upon a reconsideration of the accompanying drawings and following specification wherein are disclosed in highly schematic form apparatus for carrying out the method of the present invention, it being understood that many changes and modifications may be made therein for adapting the same to commercial use without departing from the spirit of the invention as expressed in the appended claims.

In said drawings Figs. 1 to 7, inclusive, are directed to recording methods and apparatus, and Figs. 8 to 11, inclusive, are directed to methods and apparatus for reproducing; and Fig. 1 is a front elevation of a group of keys on a piano keyboard shown with the front rail removed;

Fig. 2 is a schematic and diagrammatic showing of the whole recording apparatus providing the equipment of one key of the recording piano;

Fig. 3 is a simplified wiring diagram of the electrical portions of the apparatus for Fig. 2;

Fig. 4 is a perspective view of a single piano key and the associated action member for transmitting movement thereof to the hammer and showing a light valve associated therewith in the inactive position;

Fig. 5 is a view similar to Fig. 4 but showing the key depressed and the openings in the light valve in alignment;

Fig. 6 is a view similar to Fig. 5 showing the additional electrical equipment associated with the valve and enclosed in a suitable housing;

Fig. 7 is a schematic showing of three key stroke reproductions on a film, illustrating different timing and stroke intensities;

Fig. 8 is a perspective representation of the film mechanism on the reproducing instrument showing the apparatus for a single key for converting from a strip of variable density on the film to an electric current having the characteristics necessary to reproduce a note as struck by the original performer;

Fig. 9 is a transverse section through the reproducing apparatus shown on a larger scale;

Fig. 10 illustrates schematically the apparatus associated with each key of the reproducing piano for effecting the operation of the hammer associated therewith in accordance with the intensity of film passing at the time; and Fig. 11 illustrates the wiring diagram in simplified form of the apparatus of Fig. 10.

The shortcomings of the old form of mechanical piano player or player piano using a punched or cut paper roll are too well remembered to need much emphasis. These devices functioned automatically and the paper with its openings cooperated with a tracker-bar having an opening for each note to be played so that the cooperation of a tracker-bar opening and a paper opening or slot acted as a valve to permit the operation of pneumatic relays and finally a small bellows which actuated the hammer. The valve comprising the tracker-bar and the paper is subject to being either fully opened or fully closed and hence, assuming constant air pressure for the operating bellows, only a single intensity of note reproduction is possible.

The above was true only for the most mechanical of the devices, for those equipped with foot pedals for providing the air supply were capable of operation by a skilled performer to emphasize certain notes or groups of notes by a sudden and more violent pressure on the pedal. Few people were skillful enough to handle the apparatus and obtain any but the most elementary results, and even the most skilled performer could not manage to remove from the music that mechanical tinge which made it unacceptable to those caring for fine music. Many efforts were made to improve the action of this type of player piano and some of the later instruments divided the keyboard up into a number of sections and provided emphasis control apparatus handled by additional perforations in the sheet or roll. It was therefore difficult to reproduce with any degree of exactitude the playing of any good performer.

The present invention proposes to substitute electro-optical means for the pneumatic mechanism of the earlier player pianos and to so arrange it that records or film rolls may be made containing the exact reproductions as played by any performer, with each note timed and adjusted in intensity in exact accordance with his initial playing of the same, and to provide apparatus for effecting, from this record or film roll on any properly equipped piano, so close a reproduction of the initial performance that results equivalent to listening to the artist can be achieved in any home entirely automatically.

In order to fully appreciate the characteristics and operation of the method and apparatus of the present invention, attention is directed to Fig. 1, showing a front elevation of several of the keys of a piano. Here a number of keys A are shown in their normal or repose position and a single key B is shown as fully depressed until its under surface strikes against the felt cushion C which stops its downward movement. The total stroke is represented by the distance D which varies in standard pianos between ¼ and ⅜ of an inch. When the key is depressed the relatively complicated mechanism generally referred to as "action" moves the corresponding hammer through a considerable arc until it strikes the associated strings. The sound continues, during this depressed condition, with diminishing intensity and over a period dependent to some extent on the rate at which the key was depressed, which determines the loudness of the note. During the performance of a musical selection any note on the piano may be struck a great number of times and seldom twice alike. It may be played through the ranges from minimum to maximum intensity of a sound, it may be struck slowly but vigorously or rapidly and with tremendous intensity. Sometimes to achieve certain staccato notes the key may not even be pressed for the full length of its available stroke and yet the hammer is thrown against the strings with enormous velocity, producing a short note of high intensity.

For the sake of simplicity the following description will be restricted to the method and apparatus as provided for any single key and its associated action of the recording and reproducing pianos. To complete the apparatus on either piano duplication for all of the eighty-eight keys is all that is necessary. The apparatus has been disclosed in its most elementary form for the sake of simplicity in showing and conciseness in description.

Referring now to Fig. 2, there is shown in schematic form all of the elements necessary for recording on a photographic film 15 a note as struck by a single key B of a piano. The film 15 is any conventional photographic film arranged on a supply roll 16 and adapted to be wound on a take-up spool 17 at a constant velocity during the recording by any well known mechanism such as motor M. The film is enclosed in a suitable light tight box (not shown) provided at the front with a plate 20 perforated as at 21 for each note. Light is adapted to be transmitted through this perforation, which restricts its spread, from a suitable source 22 in any desired manner, preferably through a rod 24 of Lucite or similar material blackened on the outside to prevent the entrance of unwanted illumination. Such a rod will conduct light in curved paths and is useful in conveniently grouping the eighty-eight lamps and leading their light to a relatively narrow film of which a narrow strip is allotted to each note or key.

The lamp 22 is filamentless and is preferably of the gas filled neon type capable of instantaneous response to changes in current or voltage and having no "hold over" or lag.

The vertical member or wippen of the action of an upright piano is shown at 26, which member is lifted by the movement of the key B when a note is struck. This member supports a plate 27 forming one-half of a light valve, the other half comprising a similar plate 28 suitably supported in fixed position from any desired part of the piano. Each of the plates, as is shown more completely in subsequent figures, is provided with a vertical slot 42, 43, the two being normally just out of register and adapted to be brought into gradually overlapping alignment as the key is struck. These plates, constituting the light valve to control the light from a constantly burning source 30, which is focussed by means of lens 31 on to the sensitive area of a photoelectric cell 32, which converts the light beam to a corresponding electric current whose intensity varies exactly as the intensity or area of the light on the photoelectric cell. A suitable electronic amplifier of straight line characteristics, represented by tube 33, amplifies this current and supplies it to lamp 22 for illuminating the same. The photoelectric cell is illustrated conventionally to represent any of the three recognized types thereof and is in no sense limiting.

The circuit of the electrical apparatus of Fig. 2 is more completely but still schematically shown in Fig. 3, where the electronic tube 33 is seen to include a filament 36, an anode 37 and a grid or control element 38. The filament is maintained heated by a suitable battery or other source of current and a high voltage battery 40 is connected between the filament or cathode and the anode 37 with the lamp 22 arranged in this circuit. The photoelectric cell 32 is connected in any suitable manner between the cathode and the grid 38 so that changes in potential from this cell vary the potential on the grid and hence the conductivity of the anode-cathode circuit of the tube to vary the amount of current supplied to the lamp 22 and hence to vary its light intensity in accordance with the amount of light falling on the photoelectric cell.

Fig. 4 shows in perspective the arrangement of the light valve. The stationary plate 28 is suitably mounted on and forms the forward wall of a box or chamber 41 in which the photoelectric cell is housed. The movable plate 27 is attached by a clip 27' to the action member 26 and in the normal or repose position of the key K is parallel to plate 28, closely adjacent thereto but with the respective slots 42 and 43 displaced vertically just sufficiently to prevent light from passing from lamp 30 through the slot 42, which is normally covered by the upper portion of plate 27. Any minute vertical movement in the upward direction of plate 27 causes the beginning of overlapping of apertures 42 and 43 and admits light to the photoelectric cell.

In Fig. 5 the apparatus of Fig. 4 is shown with the key fully depressed so that apertures 42 and 43 are now entirely in register and a full beam from the lamp is admitted. In Fig. 6 additional apparatus is shown cooperating with the light valve, the parts of which are in the same position as shown in Fig. 5. These include the constantly burning lamp 30 of high intensity properly arranged in lamp house 45 through the side wall of which the plate 27 passes; the lens 31 which concentrates the light beam on the sensitive area of the photoelectric cell 32; the photoelectric cell; and its housing 41, the whole mechanism being supported on a bracket 46 from the bed plate of the keyboard.

It will be appreciated from the arrangement of parts associated with the key on the recording instrument that light may be concentrated on the sensitive area of the photoelectric cell by means of the lens and that the amount of light falling on the lens depends on the degree of overlap of the slots in the light valve. The density of the exposed and developed negative film resulting from the light falling on the photoelectric cell will depend on the intensity of light delivered by lamp 22 and will vary from full transparency on the negative achieved when the valve was closed to dense black achieved when the valve was fully open. This arrangement will be reversed in the positive made from the original negative for ease in reproduction and use. If the performer strikes the key B very lightly the rate at which the light increases through the light valve is slow and the density on the resultant positive film will be decreased from maximum to minimum at a rate exactly dependent on the speed at which the key is depressed. If the key is continually held down after reaching its maximum depression there is no change in the film density. If the key is depressed rapidly minimum density is achieved almost instantly on the positive film, it being remembered that the film always moves at a constant rate downward. A reference to Fig. 7 will show what is meant for here are represented three sections of film showing different note characteristics. On the exposed positive film in the area 50 the upper portion 51 is of almost maximum transparency since full brilliancy light has fallen on the negative film. At 52, however, is represented maximum density of film resulting when the light valve was fully closed. With the film travelling downward this then would be a fast increase from maximum density to maximum transparency or a rather loud note. In the positive film area numbered 53 it will be seen that beginning at the bottom the increase in density is much slower and full transparency is reached more slowly, showing a slower, softer stroke. At 54 is shown a stroke lasting only a fraction of the length of the stroke in the first two film strips and high maximum transparency is achieved very rapidly. This is the type of result from an extremely hard, rapid staccato stroke on the key. These three portions of a film strip represent only a very minor number of the infinite variations which may be achieved, so that the true touch and technique of the musician can be both fully recorded. If desired, the pedalling action of the performer can be recorded in exactly the same manner as that described for the key action, for any of the upright rods moved by the pedal may carry a light valve as previously described.

The film as produced is developed into a negative and can then be made into any desired number of positives, reversing the areas of light and dark from those on the negative.

On the reproducing piano the apparatus is simpler than on the recording piano. Any convenient wind-up spool 60, as shown in Fig. 8, may be arranged to be constantly driven as by motor M' to pull the film 61, made as just described, over the guide means 62 from the main spool 63. Beneath the film at any appropriate place is provided a row of photoelectric cells 67, one for each exposure strip, representative of a key on the piano. The construction and arrangement of these for multiple disposition has not been illustrated but can readily be achieved by staggering of the devices, if necessary, to obtain the desired space for effective use. Light is projected onto each exposure strip from a lamp 65 through the blackened Lucite rod 66, the end of which stops just short of the film on the opposite side thereof from the photoelectric cell 67.

Referring now to Fig. 10, an elementary arrangement of the apparatus for reproduction is illustrated. At the left appears the lamp 65 constantly illuminated and adapted to pass light through any areas of reduced density within the strip on the film which controls it. Any suitable photoelectric cell 67 receives this light after it has passed through a limiting aperture in a suitable shield 69. The photoelectric cell passes a current whose intensity is exactly appropriate to the density of the film through which the light passes, and this current is amplified by a suitable electronic amplifier represented by tube 68, the output of which will be in proportion to the light density passing through the film, and current from this tube energizes the magnetic device 70 arranged to lift any suitable action member 71 for operating the piano. The instantaneous energy delivered by the member 71 is exactly proportional to the quantity of light passing the film at the same instant.

As seen in Fig. 11, the electrical apparatus of Fig. 10 is associated in a more or less conventional circuit. The cathode 72 of the amplifier tube 68 is energized from any suitable source of power and the photoelectric cell 67 is connected between the cathode and the grid 74 of the tube. The anode 75 is connected back of the cathode through the magnet 70 and the high potential battery 77. This arrangement adjusts the intensity of current in the magnetic device 70 exactly in accordance with the amount of light falling on the photoelectric cell as controlled by the film density. The magnetic device may be of any well known type and is here shown as a simple solenoid whose movable core 80 is attached to or arranged to cooperate with a clip 81 on the action member 71 for lifting the latter when the solenoid is energized. The keys of the piano can be arranged to be locked in position or may be allowed to move in unison with the action if desired.

The operation of the solenoid may be made to affect the rate of movement of the hammer of the piano in exact accordance with the record.

The following table will indicate the operations in recording and reproduction:

*In recording*

The softer the note
The slower the increase in light on the photo cell
The slower the increase in light at the film The louder the note
The faster the increase in light on the photo cell
The faster the increase in light at the film

*Reproduction*

The faster the increase in light at the photo cell
The faster the action in the solenoid
The louder the note The slower the increase in light at the photo cell
The slower the action in the solenoid
The softer the note From the above it will be seen that the reproducing piano faithfully delivers a hammer stroke on the strings exactly in accord with the time-intensity of hammer stroke as played by the performer. The tone comes from the reproducing piano but the touch and intensity is controlled by the film record.

I claim:

1. Apparatus for recording piano music as played by a performer to provide a record of the exact "touch" for each note comprising in combination, for each piano key a light valve having a part mounted on a movable portion of the piano action and closed when the key is at rest, means including said action part to open said valve in unison with key movement, a constant source of light, a relatively narrow photofilm, means to move said film at a constant rate of speed, and means to expose a strip of said film to light of varying intensity as passed by said valve, said light intensity and film sensitivity being so corelated as to produce a record of varying density on said film representative of the manner of playing the corresponding note.

2. Apparatus for recording piano music as played by a performer for reproduction on a piano with each note reproduced with the same speed and force as played including in combination, a light valve for each key and having a portion thereof carried by a part of the piano action whereby to open said valve at a rate commensurate with key movement, a film of photo sensitive material having a strip allotted to each key, means to move said film at a constant rate, and means to expose each of said strips of said film to light regulated in time-quantity by the said valve associated with the corresponding key whenever the latter is operated, said light intensity and film sensitivity being so corelated as to produce a record of varying density on said film representative of the manner of playing the corresponding note.

3. Apparatus for recording piano music as played by a performer for reproduction on a piano with each note reproduced with the same "time-intensity" as played including in combination, a light valve for each key, means to open said valve at a rate commensurate with key movement, a constant source of light at one side of said valve, a photo-electric cell at the other side, an electronic amplifier energized from said photocell and arranged to provide straight line amplification, an instantaneously variable light source energized from said amplifier, a film of photo sensitive material having a strip allotted to each key, means to move said film at a constant rate, and means to expose each of said strips of said film to the said instantaneous variable light source associated with the corresponding key.

4. Apparatus for making a film record of piano music for reproduction on a piano with each note reproduced as initially played as regards rate of speed and power of stroke, including in combination, a light valve for each piano key comprising a pair of overlapping slotted plates, means fixedly supporting one of said plates, means mounting the other plate with the slot of each normally just eclipsed by the other plate and adapted for movement in unison with a part of the piano action connected to the key, a constant source of light at one side of said valve, a photoelectric cell at the other side of each valve, a lens to focus the light passing through varying areas of opening of each valve onto the corresponding cell, an electric lamp of the instantaneously variable intensity type for each cell, an electronic amplifier connected to amplify the output of each cell to energize its lamp to the extent represented by the instantaneous opening of the light valve, a film of photo-sensitive material of less width than the piano keyboard and having a narrow strip allotted to each key, means to move said film at a constant rate past said lamps, and means to direct the light from each lamp onto the allotted strip of film to provide a record of variable density thereon representative of the playing effort of notes by said key.

5. The recording apparatus as defined in claim 4 in which the light directing means includes a rod of transparent plastic material having an opaque external coating.

6. The recording apparatus as defined in claim 4 in which the light directing means includes a perforated shield closely adjacent the film.

7. Apparatus for use with a conventional piano for reproducing music recorded on a photofilm having a separate strip thereof allotted to each note and having areas of varying light transmitting characteristics representative of the speed and force of striking the key producing that note by a performer, comprising in combination, a bank of photo-cells each allotted to one of said strips, means to pass a film as described at constant speed past said cells, a constant light source on the opposite side of said film from said cells, an electronic amplifier for each cell and a magnetic device actuated by each amplifier and each device positioned to engage with the action of one key of the piano to actuate the hammer thereof in accordance with the characteristic of the film strip.

8. The apparatus as defined in claim 7 in which the constant light source is directed onto the photo-cell through the film and a shield having a small perforation therein to limit the effective length of strip passing light to the cell.

9. The apparatus as defined in claim 7 in which the light from the constant light source is directed onto the proper strip of the film by a rod of total internal reflection.

10. Apparatus for use with a conventional piano comprising a separate electro-magnetic device for and arranged to actuate the piano action which is associated with each key, a record sheet having thereon a strip allotted to each of said devices, said strips having portions indicative of playing of the corresponding key, said portions including means indicative of the speed and force of operation of the action and means to control the movement of the corresponding electro-magnetic device in accordance with said strip means.

11. The method of recording and reproducing piano music comprising playing music on a piano, recording on a travelling sheet the notes played and the exact speed and force of playing of each note, processing said sheet, transferring said record sheet to a reproducer, there advancing said record sheet, scanning the sheet, converting the speed and force recording of each note to an electric current of corresponding instantaneous intensity and actuating the corresponding action element of a piano by said current to reproduce the original playing of the note.

12. The method of recording and subsequently reproducing piano music comprising the steps of manually playing a piano, moving a blank record sheet at a constant speed, recording on said sheet in separate strips thereof each note played in its timed relation to others and the rate and rate changes at which the key for playing the same was struck, subsequently moving said formed record at the same constant speed, individually scanning each strip thereof, converting any note characteristics thereon into an electric current of corresponding instantaneous value and using said current to actuate the action part of a standard piano for the corresponding note.

CARL WORCH.

REFERENCES CITED

The following references are of record in the file of this patent:

UNITED STATES PATENTS

| Number | Name | Date |
|---|---|---|
| 840,397 | Swing et al. | Jan. 1, 1907 |
| 1,003,201 | Phillips | Sept. 12, 1911 |
| 1,106,819 | Kelly | Aug. 11, 1914 |
| 1,367,634 | Stoddard | Feb. 8, 1921 |
| 1,369,764 | Van Der Bijl | Feb. 22, 1921 |
| 1,678,872 | Potter | July 31, 1928 |
| 1,949,771 | Zoppa | Mar. 6, 1934 |
| 2,031,764 | Eremeeff | Feb. 25, 1936 |
| 2,222,991 | Sorkin | Nov. 26, 1940 |
| 2,274,687 | Ives | Mar. 3, 1942 |
| 2,378,389 | Begun | June 19, 1945 |